June 12, 1951 W. G. DOW ET AL 2,556,685
SMALL THROAT PORTABLE WELDER
Filed Nov. 5, 1945 4 Sheets-Sheet 1
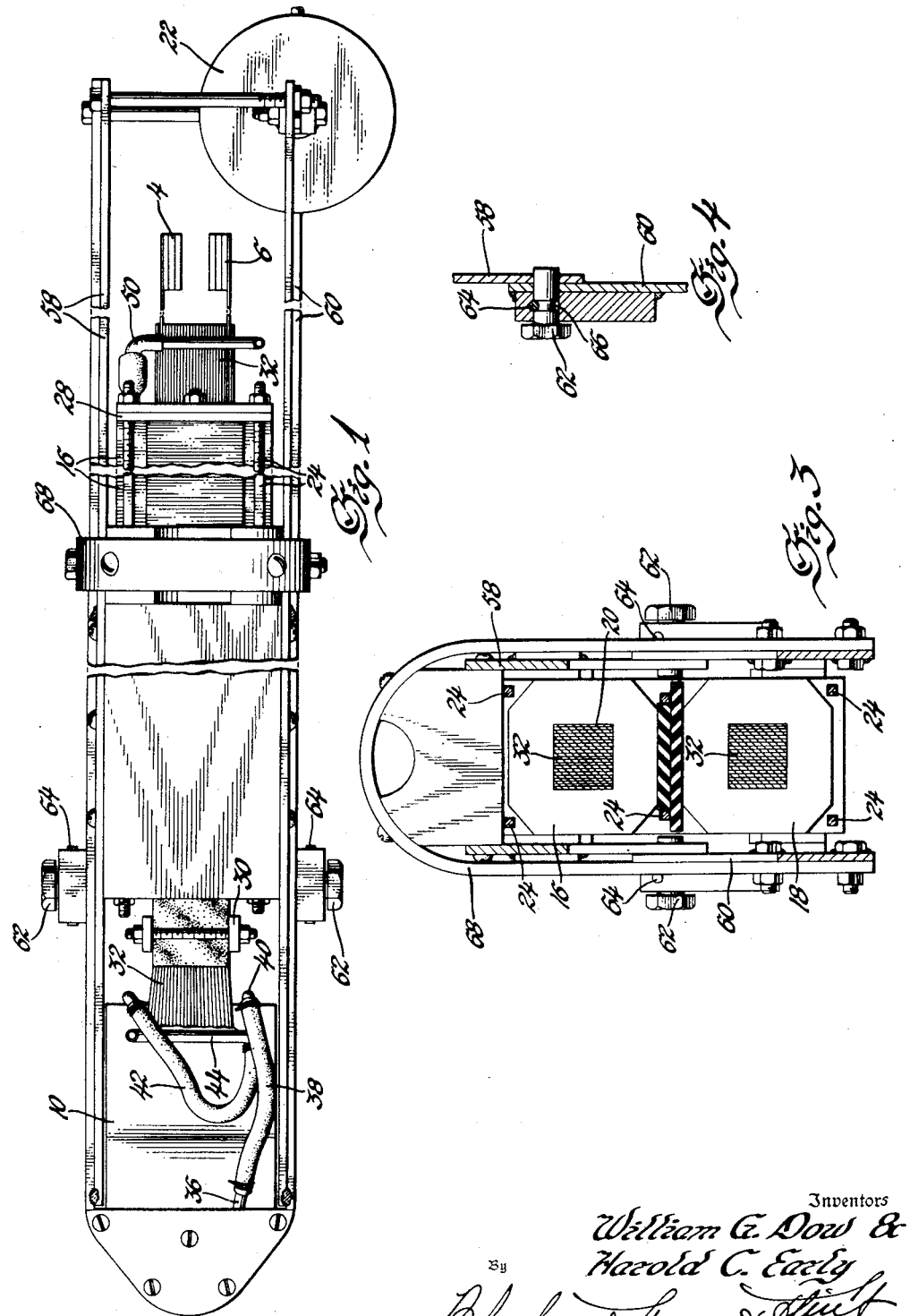
Inventors
William G. Dow &
Harold C. Early
By Blackmore, Spencer & Hurd
Attorneys June 12, 1951  W. G. DOW ET AL  2,556,685
SMALL THROAT PORTABLE WELDER
Filed Nov. 5, 1945  4 Sheets-Sheet 2
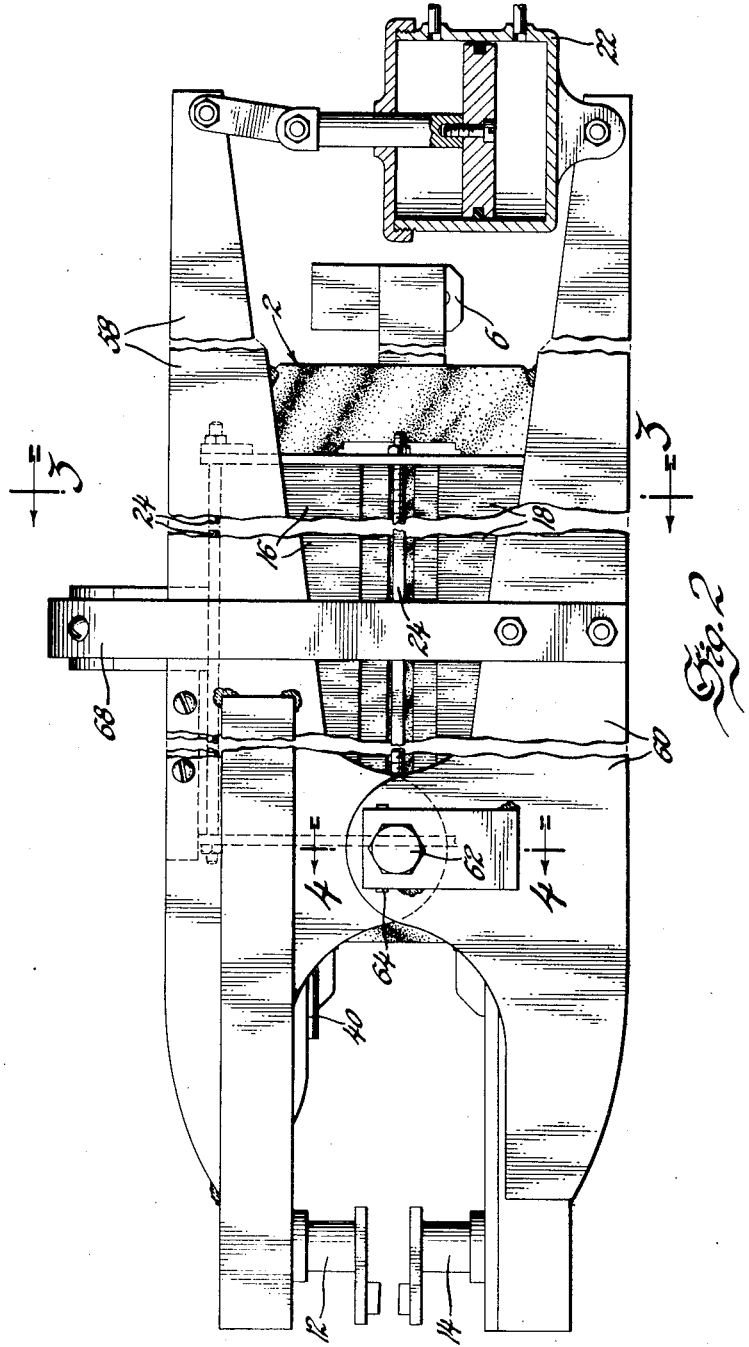
Inventor
William G. Dow &
Harold C. Early
By
Blackmore, Spencer & Flint
Attorney

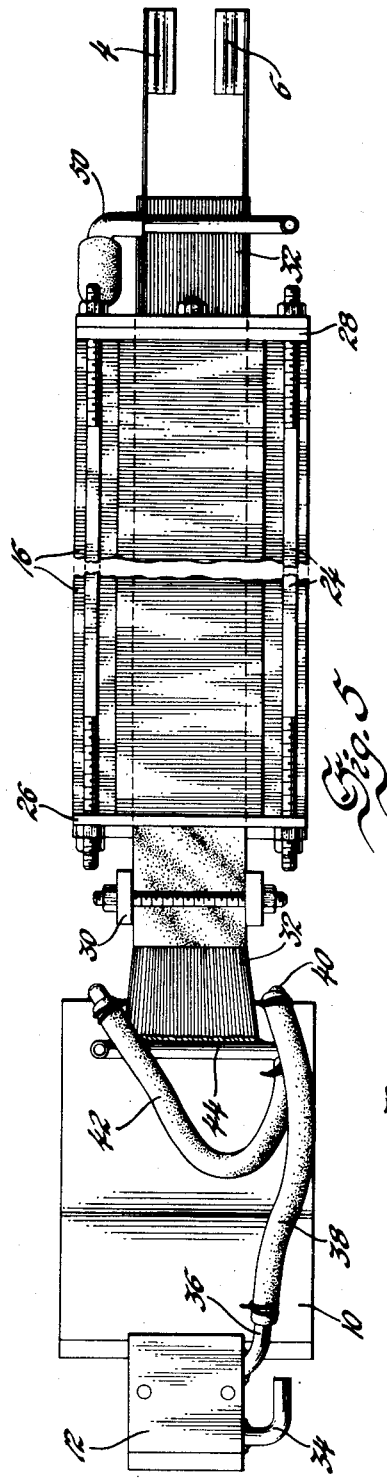
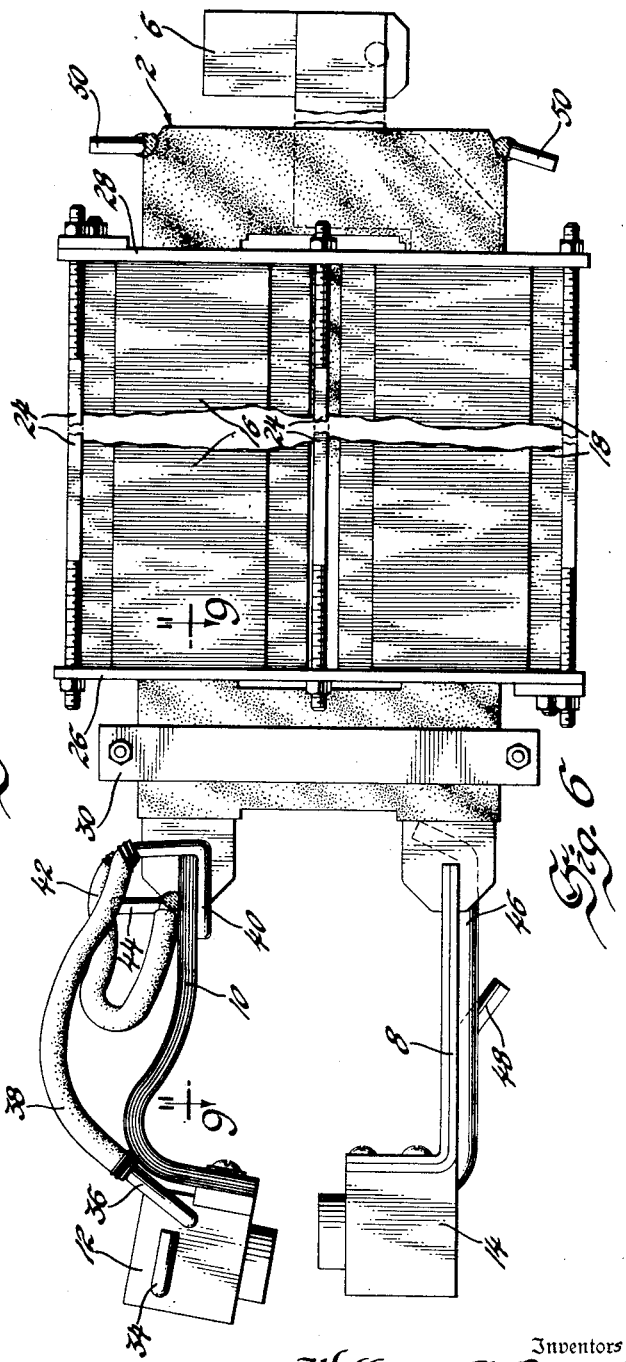

June 12, 1951  W. G. DOW ET AL  2,556,685
SMALL THROAT PORTABLE WELDER

Filed Nov. 5, 1945  4 Sheets-Sheet 4

Inventors
William G. Dow &
Harold C. Early
By Blackmore, Spencer & Flint
Attorneys Patented June 12, 1951

2,556,685

UNITED STATES PATENT OFFICE 2,556,685

SMALL THROAT PORTABLE WELDER

William G. Dow, Ann Arbor, and Harold C. Early, Beaverton, Mich., assignors to General Motors Corporation, Detroit, Mich., a corporation of Delaware Application November 5, 1945, Serial No. 626,718

2 Claims. (Cl. 323—44)

This invention relates to resistance welding means and more particularly to portable means including both the welding electrodes and the transformer supplying them with power.

A major part of the equipment for performing resistance welding has been fixed equipment to which the work must be transported and held during the weld period. There were several reasons for this, first, high clamping pressures must be applied to the electrodes and the means necessary to accomplish this is usually bulky, the parts must have sufficient strength to withstand these pressures and therefore cannot be light. Second, the currents carried are very large and the voltage low so the conductors have to be of good size and bulky and if the windings are bulky it follows that the magnetic core materials will likewise be heavy. All of these factors contributed to the size and weight of resistance welding means.

There are however many advantages to be gained by making portable apparatus for resistance welding on relatively heavy material, one of which is the ability to apply the weld to large parts by bringing the welder to the part rather than the part to the welder. A further advantage is that utilizing a more efficient design would result in less power per weld and improve the operational economy. In addition a saving in weight and material would decrease the original cost so that both from a mechanical operational standpoint and also an economic one it would be highly desirable to provide a portable relatively heavy duty resistance welding means.

One of the manners in which the throat of an electrical welder is defined is by stating how high and how deep it is. This is of course of primary interest to the operation to be performed thereby. Both of these dimensions affect the throat inductance of the welder and place possible electrical restrictions on the design. The throat inductance must be kept down if the apparatus is to be small but of course the dimensions cannot be too small themselves or the welder will be too limited in its utility. There is one other dimension of the throat which is usually little thought of and that is the width and by increasing the width of the conductors forming said throat the total throat inductance can be substantially reduced.

Leakage inductance must also be kept to a minimum and this may be accomplished by providing a very close magnetic coupling between the primary and secondary. The fact that it is our intention to locate the transformer at the welding head permits the application of power from the source to the head at commercial voltages such for example as 110 volts where in instances where the transformer is located at a distance from the welder the power input is at only a few volts. Conversely the current in the present application will be much lower than in the former case such for example as 2000–3000 amperes in our device as against 30,000 amperes in the remote transformer installation. It will be at once obvious that with a reduction in current of approximately 15–1 the power necessary to drive the primary current through the cables will be much reduced. By the same token the cables will be smaller and lighter to carry the power input. If the turn ratio is kept small such as 15 to 1 then the insulation and size of the transformer may be kept at a minimum.

Since the coupling is to be very close and the cross section of the copper is small the amount of core material needed will be relatively small and, therefore, it is feasible economically to use special magnetic material that will carry very high flux densities without saturation instead of standard transformer iron, and if the transformer is cooled it can of course be operated at a much higher electrical load to physical weight ratio.

Returning to a consideration of throat size, as it will be evident that a device of this type has a relatively small throat, there are of course two current limiting factors in the secondary or welding circuit; namely, the inductance and resistance of the same. The inductance of this circuit consists of two parts, the leakage inductance of the secondary winding and the throat inductance which is dependent upon the loop formed by the leads and electrodes. It has been found by experiment that there are certain relationships between these factors which provide for optimum operation. One of these is that the secondary inductance $X_s$ of the transformer, that is, its primary inductance referred to the secondary side, should be at least of the order of three times or more the sum of the secondary leakage inductance and throat loop inductance. For best compromise between excellence of operation and conservation of space and weight the secondary inductance should be in the neighborhood of three times the sum of secondary leakage and throat loop inductance, which provides a guide for attaining a proper balance in design relation between secondary inductance and the exterior circuit.

With regard to a consideration of throat size it will be seen by the above that the variation thereof will directly vary the exterior inductance but it will be evident that in attempting to reduce the size of the throat in order to make the device smaller and more portable there is a point beyond which the electrical gain approaches the law of diminishing returns. This establishes a minimum throat size and transformer size below which there is no advantage in going.

It is therefore an object of our invention to provide a small portable welder.

It is a further object of our invention to provide a portable welding device with a transformer integral with the welding head.

It is a further object of our invention to provide a portable welder with a small throat of relatively light weight.

It is a still further object of our invention to provide a portable welder with an integral transformer having an optimum throat size to weight ratio.

With these and other objects in view which will become apparent as the specification proceeds, our invention will be best understood by reference to the following specification and claims and the illustrations in the accompanying drawings, in which:

Figure 1 is a top plan view of a welder embodying our invention intermediate parts being broken away to permit overall disclosure;

Figure 2 is a side view of the welder with intermediate sections removed;

Figure 3 is a sectional view taken on line 3—3 of Figure 2;

Figure 4 is a detail sectional view taken on line 4—4 Figure 2;

Figure 5 is a top plan view similar to Figure 1 with the housing removed to illustrate the transformer and electrode structure;

Figure 6 is a side elevation similar to Figure 2 also with the housing removed;

Figure 7:
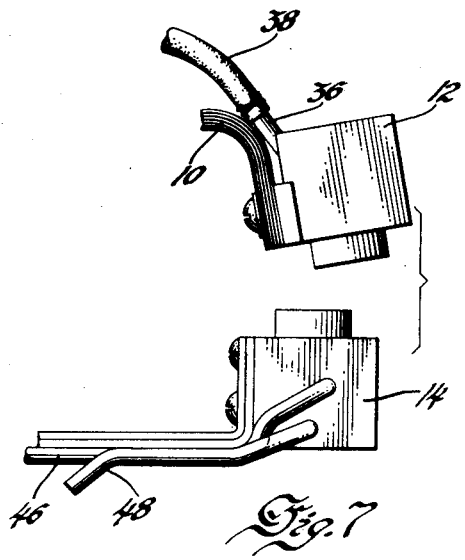
Figure 7 is a detail view of the electrodes per se.
Figure 8:
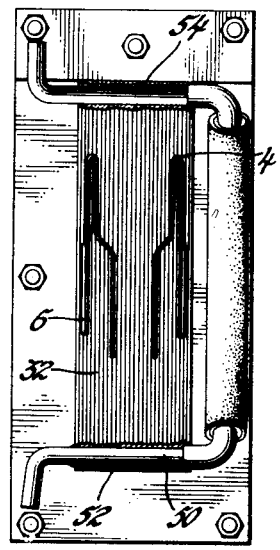
Figure 8 is an end view of the back of the transformer.

Referring now more specifically to the drawings the form of our device which is herein illustrated comprises a transformer which is carried by or built into a frame or casing a portion of which is hinged to support a movable electrode for welding application. The principal part of the apparatus is the transformer which may be described as an elongated shell type in that the windings are completely surrounded by the laminated core material. The windings themselves are formed of flat strips bent edgewise and the secondary windings are interleaved with the primary windings, being of course electrically insulated therefrom. The overall shape of these windings is that of an elongated rectangle, as best shown at 2 in Figure 6. As is common in welding application the number of secondary turns is unity or one, the number of primary turns therefore being that of the desired reduction or ratio.

As mentioned previously it is desired to maintain a relatively low ratio such as 15 or 20 to 1 in which case there would be 15 or 20 turns of primary between which are interleaved single secondary turns. This assembly goes to make up the windings designated as 2. At one end of the transformer the primary winding is brought out to the primary terminals 4 and 6. The lower ends of the secondary turns are commonly connected to a flat conductor 8 and the upper ends of the secondary turns to a wide assembly 10 of relatively thin flexible sheets which carry the movable electrode 12 at the outer end. The stationary electrode 14 is mounted on the outer end of the rigid conductor 8.

Figure 9:
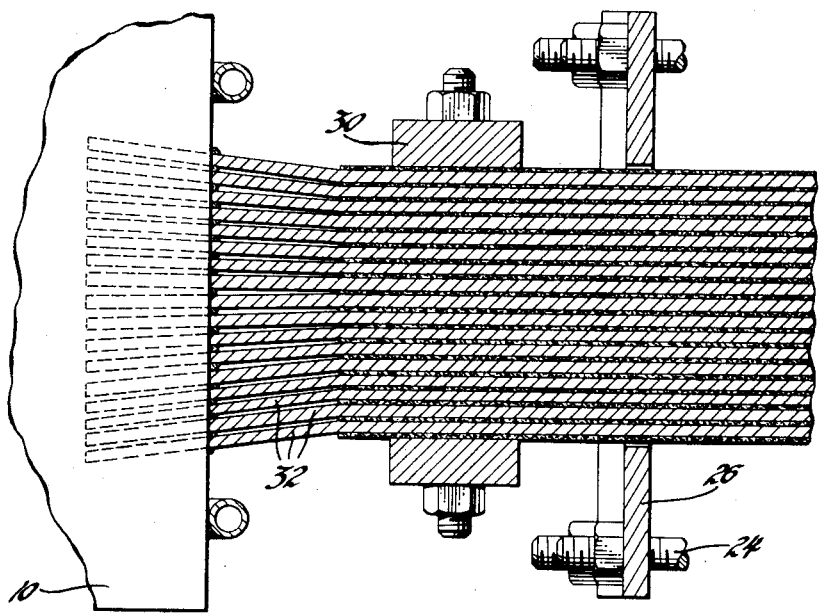
Figure 9 is a sectional view taken on the line 9—9 of Figure 6.

The core of the transformer is formed of two sets of stacked laminations 16 and 18, one series forming an enclosure for the top or upper section of the windings and the second for the bottom. The laminations are substantially square with the corners removed and have a central aperture 20 through which the winding passes. The assemblies 16 and 18 are clamped by longitudinally extending rods 24 threaded at the ends and passing through end plates 26 and 28, to secure the series together. While the passage of the windings through the openings 20 holds said windings together a clamping bar and rod assembly 30 surrounds the windings that project toward the welding electrodes. Figure 9 illustrates this very clearly and shows the various turns 32 insulated from each other and permanently secured at their outer ends to the flexible conductor strip assembly 10.

As mentioned at an earlier point in the specification the transformer can be operated at a higher rating if some means is provided for cooling and there have been provided in this case terminals 34 and 36 to the movable welding electrode for the introduction of coolant thereto. A flexible hose 38 is clamped to terminal 36 and to a hollow conducting tube 40 which is permanently secured to and around the ends of the secondary windings where the latter are joined to the flexible strips and terminates in a second hose 42. This hose has its opposite end secured to a tube 44 along the top of the strips. This system will provide coolant to the movable electrode and the end of the transformer. The lower electrode 14 is likewise provided with conductive tubes 46 and 48 which are connected to the fluid system and likewise the rear face which supports a U-shaped section of tubing 50 rigidly secured to the edges of the windings as at 52 and 54 for cooling these surfaces. This type of construction permits cooling all of the 15 or so turns of the secondary by a copper tube carrying coolant which is directly connected by soldering or other good heat transfer means to all of them because they are all at the same potential. The interleaving of the primary and secondary provides for good heat transfer from primary to cooled secondary, so that it is not necessary to cool the primary directly.

The transformer and the electrodes must be mounted in a suitable enclosing housing or casing which in this case is provided by a pair of large lever jaws 58 and 60 pivoted on a pair of bolts 62 said bolts being maintained in position to provide the pivot by pins 64 passing through peripheral grooves 66. The lower electrode and transformer are carried by the lower jaw which is made of sufficient width to enclose the same and the upper jaw carries the movable electrode. A yoke 68 is also provided to lift the assembly. Suitable clamping force such as an air cylinder 22 and piston may be fastened to the rear of the welder to exert pressure of a nature that provides an elastic follow up; that is, maintaining firm pressure approximately constant as the material being welded expands or contracts.

We have thus provided a small wide throat portable welder having a substantially low throat inductance, carrying its own transformer which permits a higher voltage to be conducted thereto and which thus has smaller feeder cables and has a low leakage, economical transformer.

We claim:

1. Light weight heavy load transformer means having primary and secondary windings, laminations enclosing said windings to provide close magnetic coupling and low leakage, a secondary output loop connected to said secondary winding including a load, inductive ratio reducing means also included in said loop, said last mentioned means including flat conductive means, said conductive means having a width to thickness ratio sufficient to reduce the inductance of said loop to a point where it is approximately one-third of the transformer secondary inductance.

2. Light weight heavy load transformer means having primary and secondary windings, inclosing magnetic core means for said windings, a secondary output loop connected to said secondary winding including a load, inductive ratio reducing means also included in said loop, said last mentioned means including wide flat conformed conductors, said conductors having a width to thickness ratio of at least five to one to reduce the inductance of the said loop so that it will have a value of the order of one-third of the secondary winding inductance.

WILLIAM G. DOW.
HAROLD C. EARLY.

REFERENCES CITED

The following references are of record in the file of this patent:

UNITED STATES PATENTS

| Number | Name | Date |
|---|---|---|
| 1,672,702 | Weed | June 5, 1928 |
| 1,761,420 | Von Henke | June 3, 1930 |
| 2,041,461 | Floyd | May 19, 1936 |
| 2,063,257 | Martin | Dec. 8, 1936 |